(12) United States Patent
Van Dam et al.

(10) Patent No.: US 7,119,796 B2
(45) Date of Patent: Oct. 10, 2006

(54) DATA INPUT SYSTEM

(75) Inventors: Catherina J. H. Van Dam, Redhill (GB); Nigel D. Young, Redhill (GB); Alan G. Knapp, Crawley (GB)

(73) Assignee: Koninklijke Philips Electronics N. V., Eindhoven (NL)

( * ) Notice: Subject to any disclaimer, the term of this patent is extended or adjusted under 35 U.S.C. 154(b) by 505 days.

(21) Appl. No.: 10/153,260

(22) Filed: May 22, 2002

(65) Prior Publication Data

US 2002/0190963 A1 Dec. 19, 2002

(30) Foreign Application Priority Data

Jun. 14, 2001 (GB) .................... 0114455.9

(51) Int. Cl.
*G09G 5/00* (2006.01)

(52) U.S. Cl. .............. 345/173; 345/179; 178/18.03

(58) Field of Classification Search ............ 345/179, 345/158, 174, 173, 18.03, 18.05, 19.01, 19.03; 178/18.03, 18.04, 19.01, 18.01, 19.04, 19.05, 178/18.05, 19.03
See application file for complete search history.

(56) References Cited

U.S. PATENT DOCUMENTS

| | | | |
|---|---|---|---|
| 3,857,022 A | 12/1974 | Rebane et al. | 235/151 |
| 4,980,518 A | 12/1990 | Kobayashi et al. | 178/18 |
| 5,073,685 A * | 12/1991 | Kobayashi et al. | 178/19.02 |
| 5,097,415 A * | 3/1992 | Yoshimura et al. | 178/18.04 |
| 5,438,872 A * | 8/1995 | Kobayashi et al. | 73/597 |
| 5,726,686 A * | 3/1998 | Taniishi et al. | 345/179 |
| 6,525,717 B1 * | 2/2003 | Tang | 345/177 |
| 2001/0000666 A1* | 5/2001 | Wood et al. | 345/189 |
| 2002/0056578 A1* | 5/2002 | Holtzman | 178/19.01 |
| 2002/0135570 A1 | 9/2002 | Iisaka et al. | |

FOREIGN PATENT DOCUMENTS

| | | | |
|---|---|---|---|
| JP | 08297534 A | * | 11/1996 |
| SE | 9904469 L | | 1/2001 |
| WO | WO0142871 | | 6/2001 |

* cited by examiner

*Primary Examiner*—Richard Hjerpe
*Assistant Examiner*—Kimnhung Nguyen

(57) ABSTRACT

A data input system is described comprising a surface 10, pen 12 and a plurality of transducers 14. The surface has a structure 10 such that when the pen 12 is moved across the structure 10, vibration is generated. This is detected by the transducers and the position of the pen 12 on the surface 10 is calculated. In the preferred embodiment of the invention the structure of the surface 10 varies across the surface 10. This means vibration signal waveforms may be associated with specific regions of the surface making identification of the pen location easier.

20 Claims, 3 Drawing Sheets

DATA INPUT SYSTEM

This invention relates to a data input system, particularly a data input system using a pen or stylus.

Data input systems which allow the user to interact directly with electronic apparatus are increasing in popularity. These include, though are not exclusive to, personal digital assistants and often comprise a pen or stylus and a screen, surface or plate.

Various pen based data input methods have been proposed. Examples include, systems which detect changes in the electrical and magnetic properties of thin layers of conductive films or foils, acoustic wave touch position detectors and systems which detect ultrasonic vibrations.

The construction of the surface component of the data input device may require the use of an extra layer of material, typically a plastic foil. This may reduce the brightness of any optical signal transmitted through the surface or increase the reflectance from the surface wherein the visibility of any optical signal transmitted through the surface is reduced. Further to this, there is the potential to cause damage to the plastic foil.

An example of a prior approach is given by U.S. Pat. No. 4,980,518 which discloses a data input system including a pen with a vibration generator, a plate which propagates the vibration, detectors to detect the vibration; a sheet of material which supports the plate and whose vibration propagating velocity is slower than that of the plate, and a circuit to calculate the position coordinates of the pen on the plate on the basis of the detection signal from the detectors. A potential problem with this system is that the device includes electronic components inside the pen or stylus which require a power source. The power source may be inside the pen or outside the pen, in which case electrical connection to the pen will be required. The pen is an active component and the data input system cannot be used if the pen is lost. The cost of the pen may also be significant.

U.S. Pat. No. 3,857,022 discloses a data input system with a non-active stylus which is tapped on a screen to produce an acoustic signal, electroacoustic transducers at the edge of the screen for detecting the acoustic signal, and a system for calculating the position co-ordinates of the stylus on the basis of the arrival time of the acoustic signal at the electroacoustic transducers. The data input device may only be used for locating discrete positions on the surface and cannot be used to input more complicated data, for example handwriting. In addition, the data input device may have limited capability in that it can only recognise inputs from a library of known inputs.

Thus there remains a need for an improved pen-based data input system.

According to the invention, there is provided a data input device comprising: a data input device for inputting data using a pen, comprising: a plate having a surface with a surface texture such that drawing the pen across the surface texture generates vibration; a transducer for detecting the vibration and outputting a transducer signal; and a processor for determining spatial information regarding the position and/or the velocity of the pen on the surface based on the said transducer signal.

Thus, vibration is generated by dragging the pen across the plate, which obviates the need for a vibration generator in the pen as required by U.S. Pat. No. 4,980,518. Moreover, unlike the arrangement of U.S. Pat. No. 3,857,022 it is possible to determine the position of the pen on a continuous basis, not just at discrete taps.

A further advantage is that the data input device may be used with any pointing device, such as a pen or stylus, which generates vibration when moved across the textured surface of the plate. If the pointing device is lost or damaged it may be easily replaced.

In embodiments, the plate is transparent. This is appropriate when the plate is a display screen, for example in a personal digital assistant or computer. The plate may be the front plate of the display screen, which avoids any need for additional components.

In one approach, the data input device preferably comprises at least two transducers fixed to the plate, so that the processor can determine the position of the pen by comparing the signals from the transducers.

Alternatively or additionally, the surface of the plate may have a plurality of regions each having a respective texture. The vibration produced by moving the pen over the texture associated with a particular region corresponds to a known output signal from the transducer. This provides additional information about the position of the pen with respect to the screen, and may be used in conjunction with the spatial information determined by the processor from the output signals of one or more transducers. Preferably, the respective textures are distinguishable regardless of the speed of the pen.

The invention also provides a method of data input using a plate with a textured surface and a pen, the method comprising: drawing the pen across the textured surface of the plate in contact with the plate to generate vibration; using a transducer to detect the vibration generated and outputting a transducer signal; and processing the transducer signal to determine spatial information regarding the position and/or the velocity of the pen with respect to the textured surface.

The accuracy of the method may be improved if the plate is divided into regions of different texture, so that the waveform of the output transducer varies as a function of the position of the pen on the plate. The output waveform is then analysed to determine the region of the plate across which the pen is being moved. The accuracy of the spatial and velocity calculation may also be improved if the output signals from two or more transducers are used.

Embodiments of the present invention will now be described, purely by way of example, with reference to the accompanying drawings in which.

Figure 1:
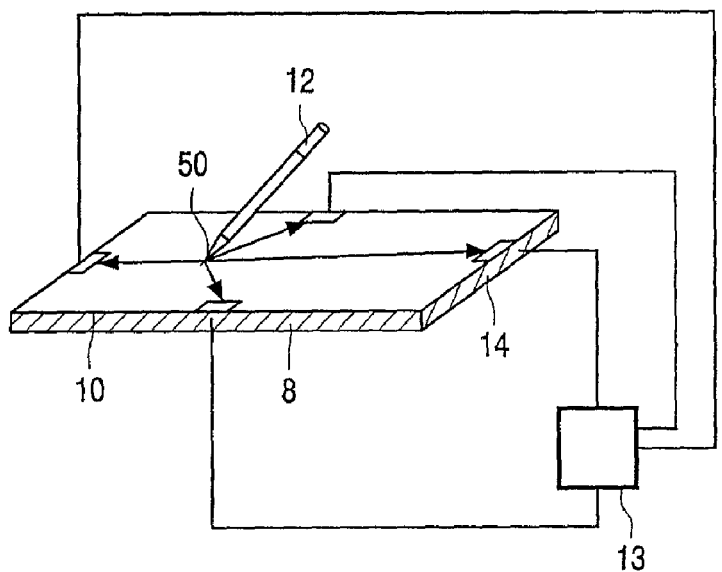
FIG. 1 shows a data input unit according to the first embodiment of the invention.

The data input system shown in FIG. 1 includes a plate 8 having a rough surface 10, a pen 12 a plurality of transducers 14 and a processor 13. Each of these is described in turn.

The pen 12 is any pointing object of an appropriate size which can be used to make contact with the surface. Typically it may be manufactured out of metal, plastic or any other hard material. Unlike some prior art approaches, in this embodiment, the pen 12 contains no electronic or other active components and hence does not require a supply of power. This means that the pen 12 is easy and inexpensive to construct. A suitable pen may be included with the data input system, or alternatively the data input system may be provided without a specifically designed pen. In the latter case any suitable pointing object may be used. The pen has a tip 50.

The plate 8 is a rigid body with a surface 10. It may be transparent or opaque depending on mode of operation of the data input. If the plate 8 is the front of a display screen such as a liquid crystal display computer screen, or the like, it is transparent and may be manufactured out of glass or plastic. If the plate 8 is to be used as part of a peripheral data input device, for example a desktop device designed to replace a computer mouse or tracker ball input system, then the plate 8 may be opaque and may be constructed out of any appropriate hard material.

The surface 10 has a structure such that when the pen 12 is moved across the surface 10, noise is generated. The surface may be formed by forming a structure on the surface of the plate 8, or if required, it may be formed from a second material which is then attached to the plate 8. Manufacturing techniques such as the etching of glass, injection moulding of plastic or other methods, which will be known to those skilled in the art may be used in the construction of the plate. The surface structure may comprise a series of ridges and troughs. These may be sinusoidal, saw-tooth or square in cross-section, or make take a random form. The structure may be evenly distributed or vary across the surface.

A plurality of transducers 14 are located around the edge of the surface 10. The transducer inputs are the vibration waves generated by drawing the pen 12 across the surface 10. The transducer outputs are electrical signals.

The processor 13 may comprise a central processing unit and memory as is known to a person skilled in the art. The processor 13 has input connections from the outputs of the transducers 14. In use, the processor 13 identifies transducer output waveforms generated by drawing the pen 12 across the surface 10, calculate the time for the vibration to travel between the pen 12 and transducer 14 and calculate the distance between the pen 12 and the transducer 14.

Because the vibration is generated by physical contact between the pen 12 and the surface 10, the present invention does not require the use of a vibration generator inside the pen. Hence, the data input device may be used with any pointing device including the finger of the operator. In addition, the use of a plurality of transducers makes it possible to determine the position of the pen on the surface on a continuous basis. This allows the user to input data in the form of handwriting or drawing.

Figure 2:
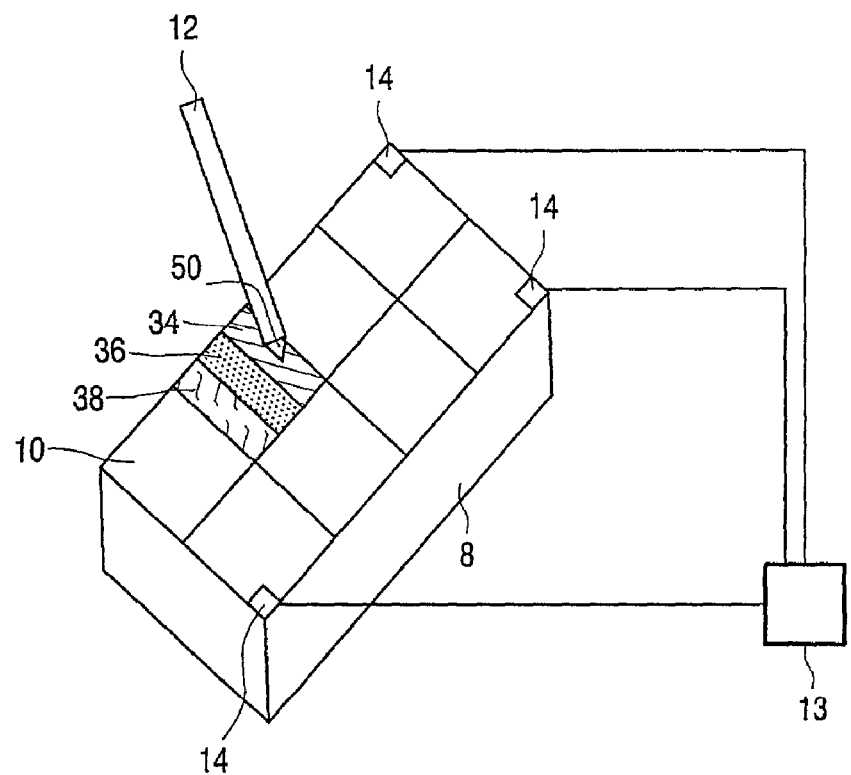
FIG. 2 shows a second embodiment of the data input unit.

FIG. 2 shows a second embodiment of the invention wherein the surface 10 is divided into a plurality of sections, each section being subdivided into regions of different surface structure 34, 36, 38. This has the advantage that the vibration generated when the pen 12 moves across a given region 34 is unique to that region 34.

Three transducers 14 are located spaced around the edge of the plate. The input to the transducers 14 is the vibration signal generated by the physical contact between the pen 12 and the surface 10, when the pen 12 is moved across the surface 10. The output from the transducers 14 is an electrical signal. In other embodiments two or more transducers 14 may be located around the edge of the plate, within the plate, or spaced away from and above the plate.

The data input system includes a processor 13. The function of the processor 13 is to identify signals generated by movement of the pen 12 across the surface 10, calculate the time for a vibration signal to travel between the point of contact between the pen and surface and the transducer, calculate the corresponding distance between the point of contact and the transducer, and analyse this information to determine the position and velocity of the pen. In addition to this, the processor is able to uniquely identify signals generated by movement of the pen 12 across a specific region 34 of the surface.

A method for using the data input device of FIG. 2 will now be described.

The pen 12 is moved across the surface 10 to generate a vibration or sound. This vibration is picked up by each of the plurality of transducers, and output as a signal waveform.

Figure 3:
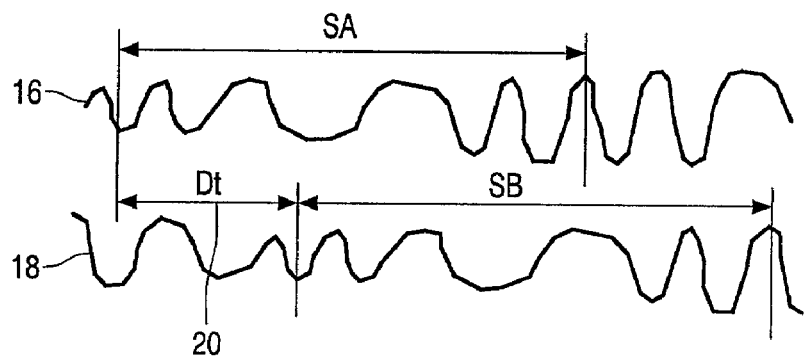
FIG. 3 shows the output waveforms of two independent transducers of the second embodiment.

FIG. 3 shows a signal output waveform 16 from a first transducer and a signal output waveform 18 from a second transducer. There is a delay time 20, between the arrival of the signal at the first transducer and the arrival of the signal at the second transducer. Additional transducers will produce more measurements, each with their own delay times 20. The delay times may be measured in the processor 13. Suitable techniques for measuring delay between two signals of the same waveform, but shifted in time are known, for example cross correlation. The delay times 20 are used to determine the distance between the pen and each detector. The distance between the pen and the nth detector is $d_n$. A minimum of three detectors are required to determine the position of the pen on the surface.

Figure 4:
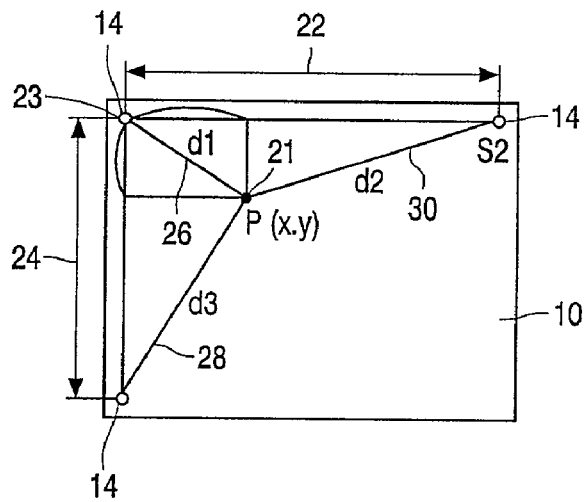
FIG. 4 is an explanatory drawing illustrating the method according to the invention for determining the position of the pen.

FIG. 4 illustrates one way in which the processor 13 may calculate the co-ordinates (x,y) from the distances $d_1 \ldots d_n$ 26,28,30. The co-ordinates define the position of the pen 12 for an embodiment of the invention in which the surface 10 is rectangular, and one corner 23 of the surface 10 is defined as the origin. The detectors 14 $S_1$ to $S_3$ are positioned at corners of the surface 10, X is the length of one the side of the surface 22 and Y is the length of the adjacent side 24. The position of the pen 21 is defined by the following equations:

$$x = X/2 + (d_1 + d_2)(d_1 - d_2)/2X \quad (1)$$

$$y = Y/2 + (d_1 + d_3)(d_1 - d_3)/2Y \quad (2)$$

Figure 5:
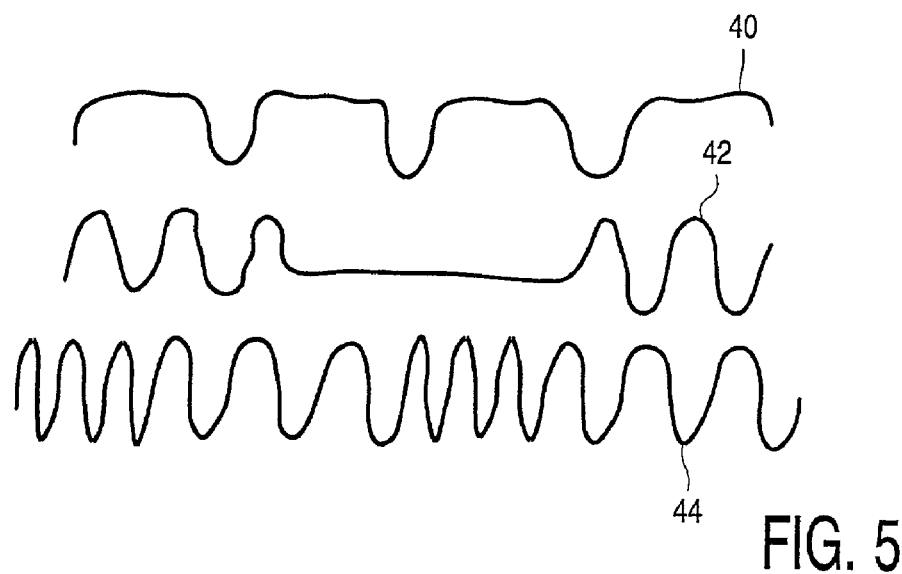
FIG. 5 shows an example of waveforms generated when the pen is moved across different regions of the surface of the second embodiment.

FIG. 5 shows schematically waveforms 40, 42, 44 which may be generated by moving the pen over regions 34, 36, 38 of different surface texture. The processor compares each waveform with known waveforms associated with a region of surface texture to provide additional information about the position of the pen on the surface.

The transducer output signals generated by dragging the pen across the different surface textures are distinguishable regardless of the speed of the pen.

A varying texture on the surface is also beneficial when determining the delay times. This is because the differences in the waveforms which arise from a surface of varying structure make it easier for the processor to unambiguously pick out segments of the waveform which were generated by the same pen movement. The texture variation may be chosen such that autocorrelation of the signal with itself is readily distinguishable from the correlation between the signal from one pen position and another.

Figure 6:
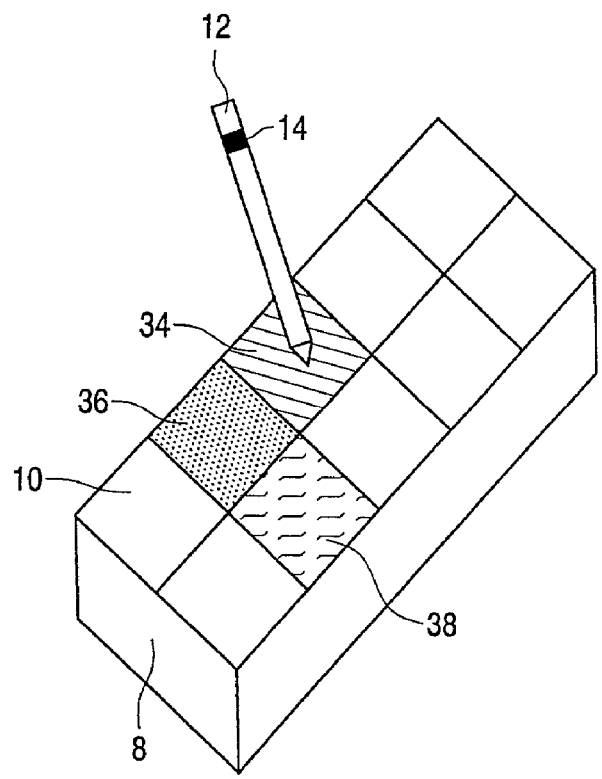
FIG. 6 shows a third embodiment wherein the transducer is located inside the pen.

FIG. 6 shows an alternative embodiment comprising a transducer 14 located inside the pen 12. This may be used in conjunction with previously described embodiments, however it is most useful wherein there is one or less transducers 14 attached to the plate 8 and the surface 10 is divided into a plurality of sections, each section being subdivided into regions of different surface structure 34, 36, 38. The texture of these regions is chosen such that the autocorrelation is high, while the cross correlation with signals from other regions is low. The output from the transducer may be processed to identify the region of the plate which is contacted by the pen. This is particularly useful where specific regions of the plate correspond to different functions. They may, for example, be used to select different options in a PDA menu structure.

Figure 7:
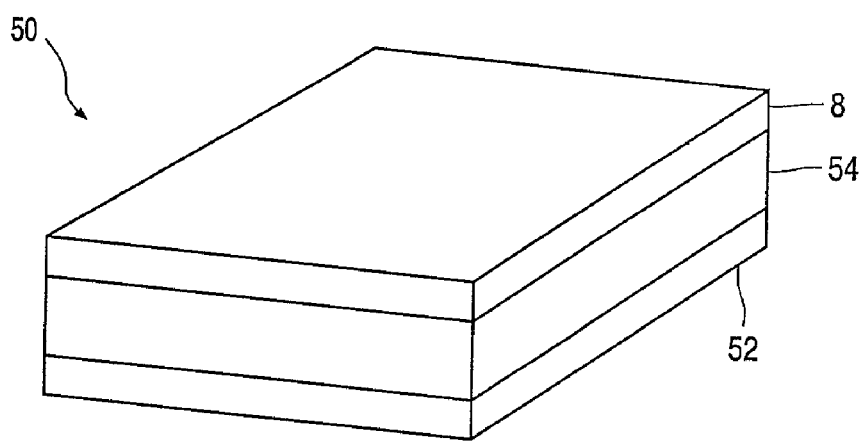
FIG. 7 shows schematically part of a liquid crystal display device incorporating a data input device according to the present invention.

FIG. 7 shows schematically a liquid crystal display (LCD) panel 50. Typically, an LCD panel comprises two opposing substrates sandwiching a layer of liquid crystal material therebetween and carrying electrodes on their opposing surfaces defining display pixels. In the embodiment shown, the plate 8 forms an upper substrate of the panel 50. The panel further comprises a lower substrate 52 and a liquid crystal layer 54 in between the upper and lower substrates. In an alternative arrangement, the plate 8 may be separate from the upper substrate of the LCD panel and mounted over the upper substrate.

Although the present invention and the preferred embodiments have been fully described, various changes and modifications will be apparent to those skilled in this field.

Although position information is output in the embodiments described, for some applications velocity information is more relevant and so the processor may be arranged to output pen velocity information.

The invention claimed is:

1. A data input device for inputting data using a pen, comprising:
   a plate having a surface with a surface texture such that drawing the pen across the surface texture generates vibration, wherein the surface of the plate includes a plurality of regions with different respective textures;
   one or more transducers for detecting the vibration generated, each outputting a transducer signal that is dependent upon the different textures; and
   a processor for determining spatial information regarding at least one of a position and a velocity of the pen on the surface, based on the transducer signals.

2. The data input device of claim 1, wherein the plate is transparent.

3. A display device including a data input device according to claim 2, wherein the plate constitutes a front of a display screen.

4. The display device of claim 3, wherein
   the plate comprises a substrate of a display panel.

5. The display device of claim 3, comprising
   a liquid crystal display.

6. The data input device of claim 2, including
   at least two transducers fixedly located relative to the plate, wherein
   the processor determines the position of the pen by comparing the signal from the at least two transducers.

7. The data input device of claim 1, which further comprises
   a pen for generating vibration by moving the pen across the textured surface of the plate.

8. The data input device of claim 7, wherein
   a transducer is located within the pen.

9. The data input device of claim 1, wherein
   the different respective textures facilitate determination of the spatial information within sections of the surface.

10. The data input device of claim 1, including
    at least two transducers fixedly located relative to the plate, wherein
    the processor determines the position of the pen by comparing the signal from the at least two transducers.

11. The data input device of claim 10, wherein
    the processor calculates delay times between vibrations generated by a movement of the pen being received by a first transducer and that same vibration being received by further transducers, and calculates the position from the delay times.

12. A display device including a data input device according to claim 11, wherein
    the plate constitutes a front of a display screen.

13. The display device of claim 12, wherein
    the plate comprises a substrate of a display panel.

14. A method of data input using a plate with a textured surface and a pen, the method comprising:
    drawing the pen across the textured surface of the plate in contact with the plate to generate vibration, wherein the surface of the plate includes a plurality of regions with different respective textures;
    using a transducer to detect the vibration generated and outputting a transducer signal that is dependent upon the different textures; and
    processing the transducer signal to determine spatial information regarding the position and/or the velocity of the pen with respect to the textured surface.

15. The method of data input of claim 14, wherein
    the output signals from two or more transducers are used to calculate the position of the pen on the plate.

16. A method of data input using a plate that is divided into regions of different textured surfaces, including:
    drawing an object across the plate in contact to generate vibrations that are dependent upon the textured surfaces;
    using one or more transducers to detect the vibration generated and outputting a corresponding transducer signal from each transducer; and
    processing the one or more transducer signals to determine spatial information regarding at least one of a position and a velocity of the object with respect to the textured surfaces, including identifying a characteristic output waveform in each transducer signal corresponding to the different textured surfaces across which the object is being moved.

17. A data input device, comprising:
    a plate having a surface with a plurality of surface textures such that drawing an object across the surface textures generates vibrations dependent upon the surface textures;
    one or more transducers for detecting the vibrations generated, each outputting a transducer signal; and
    a processor for determining spatial information regarding at least one of a position and a velocity of the object on the surface, based on the transducer signals.

18. The data input device of claim 17, including
    at least two transducers fixedly located relative to the plate, wherein
    the processor determines the position of the pen by comparing the signal from the at least two transducers.

19. A display device including a data input device according to claim 18, wherein
    the plate constitutes a front of a display screen.

20. The display device of claim 19, wherein
    the plate comprises a substrate of a display panel.

* * * * *